United States Patent [19]
Asnis et al.

[11] Patent Number: 5,818,535
[45] Date of Patent: Oct. 6, 1998

[54] METHOD AND APPARATUS FOR ADAPTIVE HYBRID MOTION VIDEO COMPRESSION AND DECOMPRESSION

[75] Inventors: Ilya L. Asnis; Victor D. Kolesnik; Sergey I. Kovalev; Kirill B. Shabunov, all of St. Petersburg, Russian Federation

[73] Assignees: Alaris, Inc., Fremont; G.T. Technology, Inc., Saratoga, both of Calif.

[21] Appl. No.: 719,834

[22] Filed: Sep. 30, 1996

[51] Int. Cl.$^6$ .................................................... H04N 7/32
[52] U.S. Cl. ............................................. 348/416; 348/699
[58] Field of Search ....................................... 348/384, 390, 348/400–404, 405, 407, 409–413, 415, 416, 419, 420, 438, 699; 382/232, 236, 238, 248, 250; H04N 7/137

[56] References Cited

U.S. PATENT DOCUMENTS

| | | | |
|---|---|---|---|
| 4,449,194 | 5/1984 | Wilhelm | 364/725 |
| 4,831,574 | 5/1989 | Duhamel | 364/725 |
| 4,837,724 | 6/1989 | Borgers et al. | 364/725 |
| 5,029,122 | 7/1991 | Uetani | 364/725 |
| 5,136,371 | 8/1992 | Savatier et al. | 348/409 |
| 5,150,432 | 9/1992 | Ueno et al. | 348/438 |
| 5,181,183 | 1/1993 | Miyazaki | 364/725 |
| 5,231,484 | 7/1993 | Gonzales et al. | 358/133 |
| 5,237,410 | 8/1993 | Inoue | 348/409 |
| 5,260,783 | 11/1993 | Dixit | 348/415 |
| 5,325,126 | 6/1994 | Keith | 348/418 |
| 5,367,331 | 11/1994 | Secher et al. | 348/14 |
| 5,367,629 | 11/1994 | Chu et al. | 395/162 |
| 5,387,938 | 2/1995 | Fukuda et al. | 348/420 |
| 5,392,072 | 2/1995 | Rodriguez et al. | 348/405 |
| 5,410,351 | 4/1995 | Kojima | 348/405 |
| 5,473,379 | 12/1995 | Horne | 348/416 |
| 5,477,272 | 12/1995 | Zhang et al. | 348/407 |

OTHER PUBLICATIONS

Gregory K. Wallace, The JPEG Still Picture Compression Standard, vol. 34, No. 4, pp. 31–45 (Apr. 1991).

*Primary Examiner*—Richard Lee
*Attorney, Agent, or Firm*—Blakely, Sokoloff, Taylor and Zafman LLP

[57] ABSTRACT

A method and apparatus for compression and decompression of motion video data. According to one embodiment, a method for compression of a first frame of motion video is provided, wherein the first frame is compared to a base frame. Based on the comparison, an altered base frame is created that contains a set of one or more regions that are based on a set of one or more regions in the first frame and a set of one or more regions from the base frame. To encode the first frame, the altered base frame is compared to the first frame to derive a motion compensation vector based on a region in the altered base frame.

25 Claims, 11 Drawing Sheets

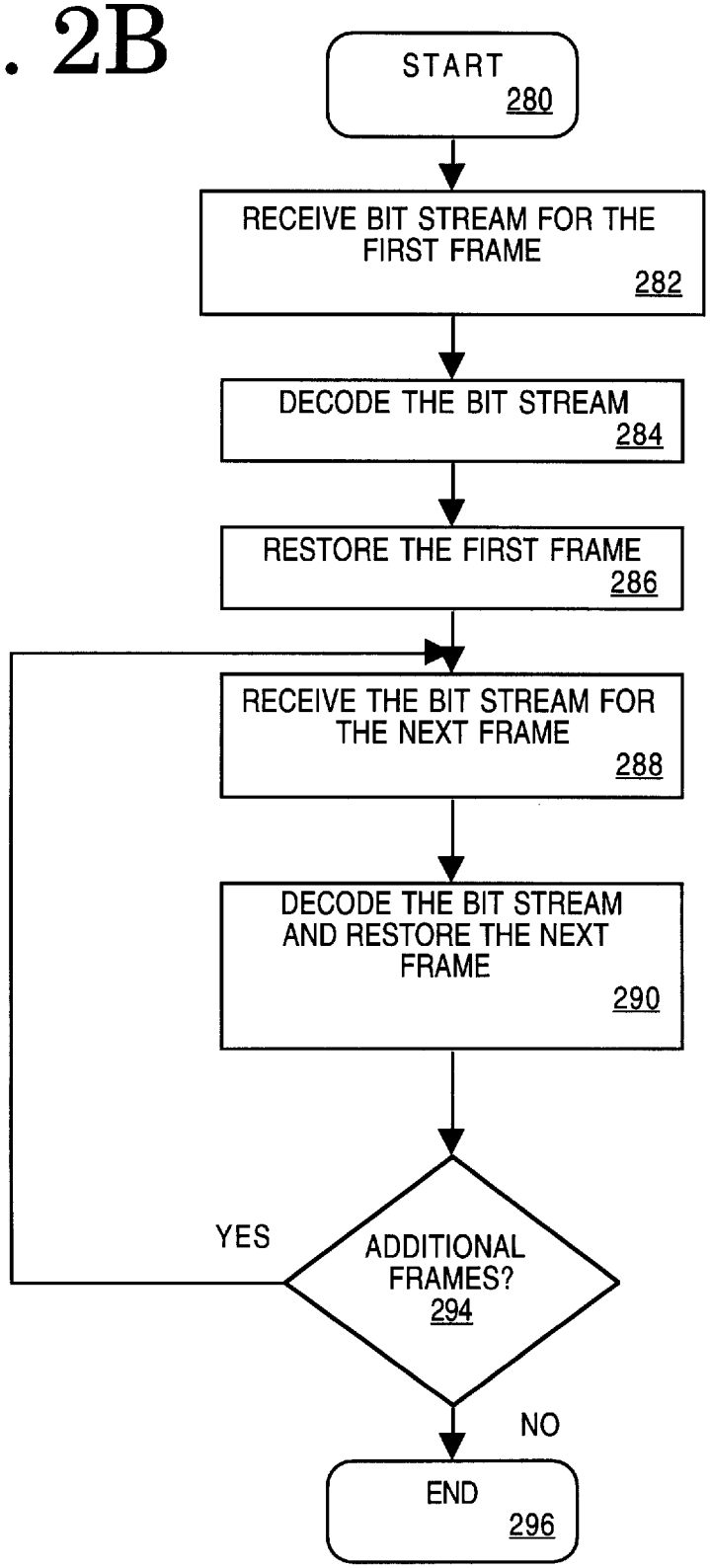

METHOD AND APPARATUS FOR ADAPTIVE HYBRID MOTION VIDEO COMPRESSION AND DECOMPRESSION

BACKGROUND OF THE INVENTION

Field of the Invention

The invention relates to the field of video data processing. More specifically, the invention relates to compression and decompression of motion video data.

Background Information

Motion video data represents a sequence of frames that, when displayed at a particular frame rate, will appear as "real-time" motion to a human eye. A frame typically comprises a number of frame elements referred to as pixels (e.g., a 640×480 frame comprises over 300,000 pixels). Each pixel is represented by a binary pattern that describes that pixel's characteristics (e.g., color, brightness, etc. ). Given the number of pixels in a typical frame, storing and/or transmitting data corresponding to every pixel in every frame in a sequence of frames requires a relatively large amount of computer storage space and/or bandwidth. Additionally, processing and displaying a sequence of frames must be performed fast enough to provide real-time motion (typically, between 15–30 frames per second). For example, a system using a frame size of 640×480 pixels, using 24 bits to represent each pixel, and using a frame rate of 30 frames-per-second would be required to store and/or transmit over 14 megabytes of data per second.

Techniques have been developed to compress the amount of data required to represent motion video, making it possible for more computing systems to process motion video data. One prior art compression technique is based on compressing data representing pixel information in each frame without using information from other frames (referred to as INTRAframe or spatial compression) in the motion video frame sequence.

One type of intraframe compression involves a form of transform encoding to reduce the amount of data required to represent information within a frame. For example, one intraframe compression method uses the discrete cosine transform (DCT) operation. Typically, the coefficients of the DCT transformed frame regions (or blocks) of pixels are quantized and the results of this quantization are encoded using one or more coding techniques (e.g., Huffman coding). To decode the DCT encoded frames, a decoder typically performs the inverse DCT operation.

Transform encoded data requires less bits to represent than the original data for a frame region. Furthermore, transform encoding provides relatively high quality results. Unfortunately, transform encoding requires a relatively substantial amount of computation. Thus, intraframe compression is performed only when necessary (e.g., when another compression technique cannot be performed).

Another type of intraframe compression typically used in conjunction with transform encoding involves eliminating repetitive (transform) encoding of similar regions within a frame of motion video. For example, if a first region in a frame is encoded using an intraframe compression technique that involves a relatively substantial amount of computation and/or storage (e.g., transform encoding), and a second region is similar to the first region, the second region does not have to be transform encoded. Instead, an indication can be generated to indicate that encoded information from the first region can be used for the second region as well. Such an indication generally provides a relatively substantial savings in computation and/or storage expense required in some other types of intraframe compression (e.g., transform encoding).

Another prior art compression technique that is typically used in conjunction with an intraframe compression technique(s) is referred to as INTERframe or temporal compression. Typically, one or more regions in one frame will be the same or substantially similar to regions in another frame. The primary aim of temporal/interframe compression is to eliminate the repetitive (intraframe) encoding and decoding of substantially unchanged regions between successive frames in a sequence of motion video frames. By reducing the amount of intraframe encoding, temporal (INTERframe) compression generally saves a relatively large amount of data storage and computation.

When using intraframe compression in conjunction with temporal compression, the first frame in a sequence of frames is intraframe (e.g., DCT) encoded. Once encoded, the first frame becomes the "base frame" for encoding the next "new" frame (i.e., the second frame) in the sequence of frames. Thus, the frame currently being encoded is referred to as the new frame, and the frame preceding the new frame is referred to as the base (or old) frame (which is assumed to have been previously been encoded and stored).

To perform intraframe/temporal compression on a new frame, the first steps performed in nearly all temporal compression systems are frame decomposition and pixel classification. One prior art technique initially decomposes the new frame in a sequence of motion video frames into non-overlapping regions (or blocks) of a predetermined size. Next, each pixel in each region of the new frame is compared to a corresponding pixel (i.e., at the same spatial location) in a base frame to determine a "pixel type" for each pixel in the new frame. ("Corresponding" region or pixel is used herein to refer to a region or pixel in one frame, e.g., the base frame, that is in the same spatial location of a frame as a region or pixel in another frame, e.g., the new frame.) Based on a set of predetermined temporal difference thresholds, each pixel in the new frame is classified as new (non-static) or old (static).

Based primarily on the classification of pixels, it is determined if each region in the new frame is substantially similar to the corresponding region at the same spatial location in the base frame. If a region in the new frame does not contain at least a predetermined threshold number of new pixels, then that region is considered to be substantially similar to the corresponding region in the base frame and is classified as "static." Static regions are encoded by storing data indicating that the region has already been encoded as part of the base frame. The data required to indicate that a region is already encoded is substantially less than the data required to represent an uncompressed or intraframe encoded region. Thus, entire (static) regions do not need to be repeatedly intraframe encoded, stored/transmitted, and decoded, thereby saving a relatively substantial degree of computation and storage.

In addition to classifying regions as "static", temporal compression techniques typically also perform motion estimation and compensation. The principle behind motion estimation and compensation is that the best match for a region in a new frame may not be at the same spatial location in the base frame, but may be slightly shifted due to movement of the image(s) in the motion video. By determining that a region in a new frame is substantially the same as another region in the base frame within a predetermined threshold distance of the region in the base frame at the same spatial location, an indication, referred to as a motion compensation (MC) vector, can be generated to indicate the change of location of the region in the new frame relative to the base frame. Thus, a static region can be considered as an MC region with a zero-magnitude MC vector. Since the region in the base frame corresponding to the MC region in the new frame has already been encoded, stored/transmitted, and decoded, the entire MC region does not have to be repeatedly intraframe encoded, stored/transmitted, and decoded. Again, by using an indication (e.g., an MC vector) to identify in a new frame a previously encoded and stored region of a base frame that is substantially the same as a region of a new frame (but spatially displaced), repeated encoding and storage can be avoided, thereby saving a relatively substantial amount of computation and storage expense.

Thus, region(s) in the new frame in the sequence of frames may be temporally encoded if found to be similar (within a predetermined temporal difference threshold) as a region in the already encoded base frame. Once the new frame is encoded, the encoded data from the new frame is used to update the base frame, and the updated base frame then becomes the base frame for the next "new" frame in the sequence of frames as the process is repeated.

Prior art temporal and spatial compression techniques suffer for a number of limitations. One of the limitations of such prior art methods is that they incorrectly classify pixels as a result of noise and light fluctuations. Several prior art techniques classify a pixel as new if it differs from a corresponding pixel by a certain threshold, regardless of whether such a difference is due to noise or insignificant light fluctuation. For example, if a pixel in a new frame is mis-classified as new (e.g., due to noise, light fluctuation, etc.), an entire region containing the pixel may be marked as new, and thus, the region would be intraframe encoded when it should have been temporally encoded (e.g., with a static region indication). As another example, if a pixel in a new frame is mis-classified as old (e.g., due to noise, light fluctuation, etc.), a region may be temporally encoded (e.g., with a static region indication) and new information in the new frame would be lost. In both examples, incorrect classification of pixels results in distortion/loss of information and/or unnecessary intraframe compression.

Another limitation of prior art compression techniques is that they do not compensate for distortion resulting from predetermined temporal compression thresholds that allow high activity regions (e.g., regions containing contours to which the human eye is sensitive) of a frame to be temporally encoded.

FIG. 1 is a block diagram illustrating another limitation of the prior art motion compensation technique. FIG. 1 illustrates how the prior art motion compensation technique can result in distortion when a motion compensation (MC) region is in relatively close proximity to an intraframe encoded region. FIG. 1 shows a number of frames, including a base frame 110 and a new frame 120, each having at the same spatial location a region 102 and a region 104. As shown, the shading of the regions 102 and 104 in the new frame 120 are at least partly different than the shading pattern of the corresponding regions 102 and 104 in the base frame 110 to illustrate pixel differences between the frames (e.g., each pattern of shading can represent a particular color or object in the frame).

FIG. 1 also shows a compression map 130 illustrating the compression technique selected for each of the regions 102 and 104 of the new frame 120. As shown by the compression map 130, it is determined (using any one of a number of well-known techniques) that the region 102 can be temporally compressed using motion compensation (MC), and that the region 104 requires some form of intraframe compression (e.g., DCT).

In FIG. 1, a region 112 (shown by brackets) in the base frame 10 is used for motion estimation and compensation of the region 102 of the new frame. A restored frame 140 illustrates the result of restoring (decoding) the new frame 120 using the selected compression techniques. As a result of the motion compensation vector selected for the region 102, a part 114 of the region 104 of the base frame 110 is reproduced as a part 116 of the region 102 in the restored frame 140. As shown by the shading pattern, the part 116 of the restored frame 140 is not the same as the corresponding part 116 of the new frame 120. Thus, some information (e.g., information in region 116) in the new frame 120 is lost in the restored frame 140.

SUMMARY OF THE INVENTION

A method and apparatus for compression and decompression of motion video data is provided. According to one aspect of the invention, a pixel in a frame of motion video is classified based on comparing the pixel type of that pixel to the pixel type of a set of pixels in the frame which are in proximity to that pixel. According to another aspect of the invention, activity level, which is determined as a function of pixel luminance, is determined for a set of regions in a frame of motion video, and the activity level is used to determine a compression threshold for the set of regions. According to yet another aspect of the invention, a base frame is modified to include a set of regions from a current frame, and the modified base frame is compared to the current frame to encode and/or decode the current frame.

BRIEF DESCRIPTION OF THE DRAWINGS

The invention may best be understood by referring to the following description and accompanying drawings which illustrate embodiments of the invention. In the drawings:

FIG. 2b is a flow diagram illustrating an overview of a method for decompressing motion video data according to one embodiment of the invention;

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

OVERVIEW OF THE INVENTION

This application describes a method and apparatus for adaptive hybrid motion video compression and decompression. According to one aspect of the invention, after a pixel in a new frame of a sequence of motion video frames has been classified as a result of comparing that pixel to the pixel at the same spatial location in a base frame, that pixel is re-classified based on the classification of nearby pixel(s) in the new frame. According to another aspect of the invention, an activity level which is based on luminance components (or drops) of a frame region is used to determine temporal compression thresholds. Since luminance drops define contours to which human vision is sensitive, activity level can be used to determine an appropriate compression method for a region having a relatively high activity level. Once activity levels arc determined for regions in a frame, appropriate compression type thresholds that maintain a satisfactory level of quality are updated for the frame region. According to yet another aspect of the invention, intraframe regions in a new frame are placed into a base frame to form an altered base frame, and temporal regions in the new frame (e.g., those that require motion compensation encoding) that are in proximity to the intraframe regions are encoded based on the altered base frame. As a result, the invention allows for relatively high quality, high ratio motion video data compression that is useful in any number of applications, such as video teleconferencing, storing/viewing motion video, etc. According to another aspect of the invention, a method and apparatus for decompression of motion video data that has been encoded according to the present invention is described. Other features of the invention will be apparent from the figures and detailed description of the invention that follow.

Figure 2A:
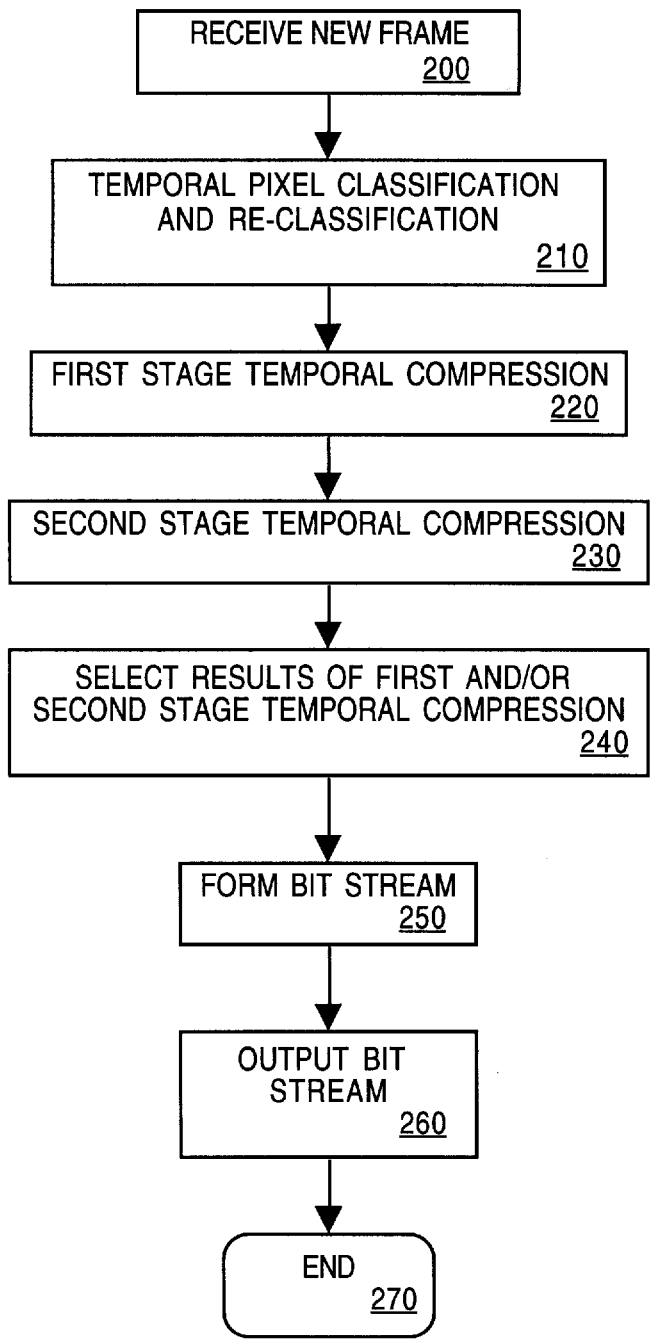
FIG. 2a is a flow diagram illustrating an overview of a method for compressing a frame in a motion video sequence according to one embodiment of the invention.

FIG. 2a is a flow diagram illustrating an overview of a method for compressing a frame in a motion video sequence according to one embodiment of the invention. Flow begins at step 200 and ends at step 270. In step 200, a new video frame of a motion video sequence is received, and flow passes to step 210. The motion video can be from any number of sources, such as computer generated animation, a video camera, a storage medium, etc.

In step 210, pixels in the new frame are classified and re-classified according to one embodiment of the invention, and flow passes to step 220. Any number of techniques can be used for the initial classification of the pixels. Exemplary methods for performing the pixel re-classification are further described with reference to FIG. 3. Although one embodiment of the invention has been described in which the pixels in a frame are re-classified, alternative embodiments of the invention do not necessarily re-classify the pixels.

As shown in step 220, first stage temporal compression is performed and control passes to step 230. During step 220, the compression map for the new frame is created. In one embodiment, a new frame is considered as one region (or block) for which a compression type is initially unknown. Such a region is referred as an unknown region (UR), and may have any shape or size. The frame is decomposed into non-overlapping regions, and a compression type is determined for each region to form a compression type map for each region. In one embodiment, each region in a frame is a rectangular block of predetermined size (e.g., 8×8), although alternative embodiments could use any number of shapes and sized regions. Regions for which a predetermined compression technique (e.g., motion compensation) is not found (e.g., UR regions) are recursively decomposed into smaller regions until the smaller regions are less than a predetermined threshold region size. Such a recursive procedure typically decreases the amount of intraframe compression that must be performed. Exemplary methods for performing first stage temporal compression are further described with reference to FIG. 5.

While one embodiment has been described in which the frame is decomposed repeatedly, alternative embodiments may not decompose the frame into regions, or may do so any number of times and in any number of ways. Furthermore, although one embodiment has been described in which a threshold region size is used to determined when to cease decomposition of regions in a frame, alternative embodiments may use any number of other methods to determine when a frame region(s) should no longer be decomposed (e.g., a predetermined threshold number of UR regions, a predetermined threshold number of temporal regions, etc.)

In step 230, second stage temporal encoding is performed, and control passes to step 240. Exemplary techniques for performing step 230 are described with reference to FIGS. 6a and 6b. While one embodiment of the invention performs both first and second stage temporal compression, alternative embodiments could perform either first or second stage temporal compression, as will be further discussed with reference to FIGS. 6a through 6b. Furthermore, although one embodiment is described wherein intraframe compression is performed prior to second stage temporal compression, alternative embodiments could perform intraframe compression subsequent to second stage temporal compression.

In step 240, one of each of the first and second motion compensation vectors are selected and control passes to step 250. Example techniques for performing step 240 are described later herein.

In step 250, a bit stream of compressed motion video data is formed and flow passes to step 260. In one embodiment, variable length coding (VLC) and multiplexing are performed to further compress the motion video data into one bit stream. Alternative embodiments of the invention do not necessarily form a bit stream and/or use VLC.

In step 260, the bit stream is output and control passes to step 270 where the flow diagram ends. Any number of different operations may then be performed on the output bit stream, including storage, transmission, decompression, etc.

FIG. 2b is a flow diagram illustrating an overview of a method for decompressing motion video data according to one embodiment of the invention. Flow begins in step 280 and passes to step 282. In step 282, a bit stream representing the (encoded) first frame in a motion video sequence is received, and control passes to step 284. In one embodiment, the bit stream contains DCT encoded data corresponding to the first frame.

In step 284, encoded data for the first frame is decoded using inverse DCT, and control passes to step 286. In step 286, the first frame is restored (e.g., transmitted, displayed, etc.). In addition, a copy of the first frame is stored in step 286 to be used as the base frame for restoring the next frame (e.g., the second frame in the motion video sequence). From step 286, control passes to step 288.

In step 288, a bit stream representing encoded data for the next frame in the motion video sequence is received, and control passes to step 290. In step 290, the bit stream is decoded and the next frame is restored as described below with reference to FIG. 7.

In step 290, the decoded next frame is restored by updating the base frame (e.g. the first frame), and a copy of the restored frame is stored as the base frame for restoring subsequent frames. From step 290, control passes to step 294.

In step 294, if it is determined there are additional frames (and/or bit streams) to be restored, control returns to step 288 for processing subsequent frames. Otherwise, control passes to step 296 where the flow diagram ends.

While one embodiment receives encoded motion video data in a bit stream, alternative embodiments may receive data in any number of ways (e.g., parallel input data). Furthermore, alternative embodiments of the invention may receive the first frame unencoded or encoded using any other encoding techniques other than or in combination with DCT.

Adaptive Pixel Classification

Figure 3:
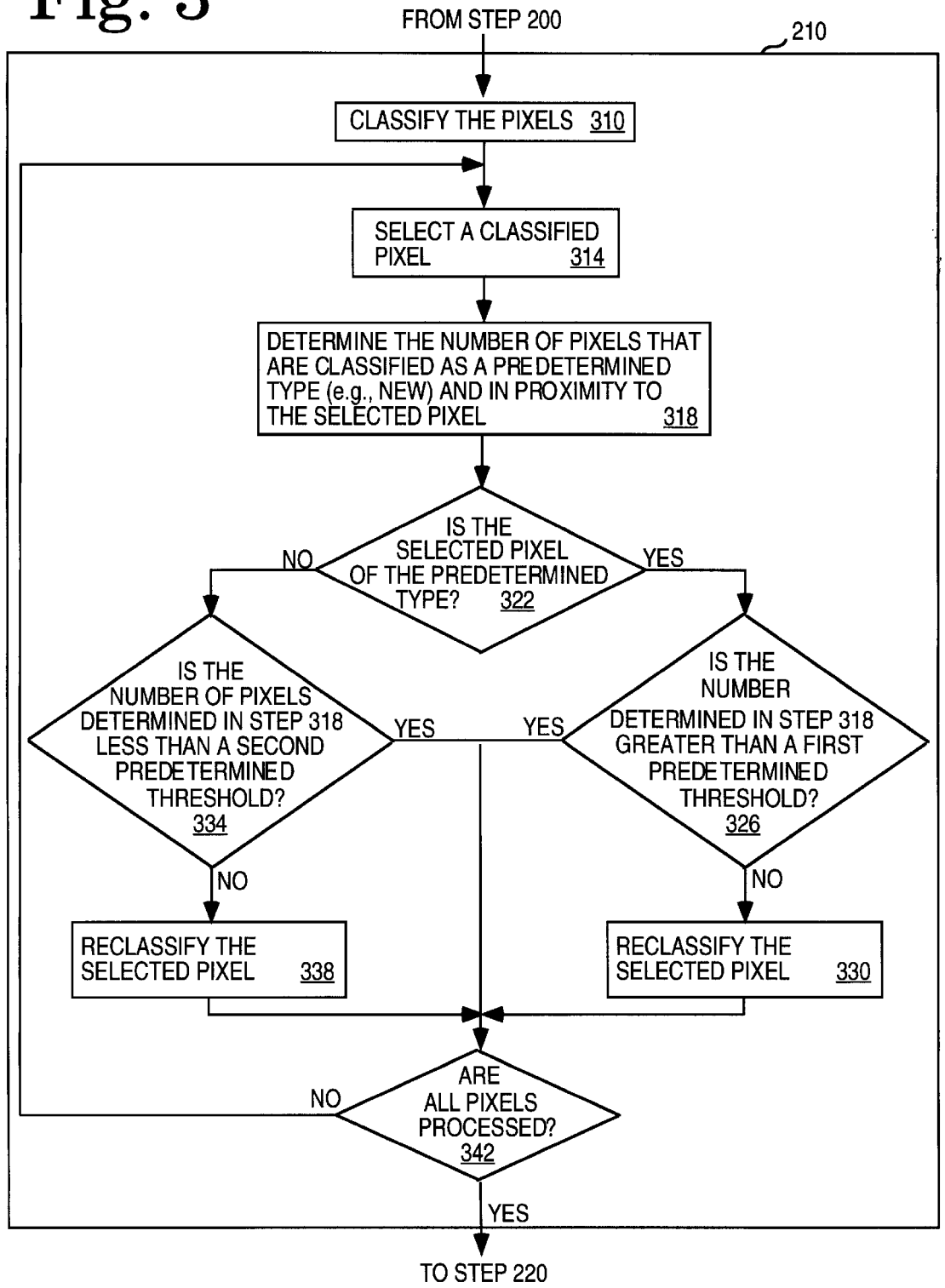
FIG. 3 is a flow diagram illustrating a method for adaptive pixel classification according to one embodiment of the invention.

FIG. 3 is a flow diagram illustrating a method for adaptive pixel classification according to one embodiment of the invention. From step 200, control passes to step 310.

In step 310, the pixels in the frame are classified and control passes to step 314. The pixels in the new frame can be classified using any one of a number of well-known techniques (e.g., temporal classification based on a threshold difference between a pixel in the new frame and a corresponding pixel in the base frame). Furthermore, any number of methods could be used to designate the results of classifying the pixels in the new frame. In one embodiment of the invention, a map of pixel types, referred to as a New Pixel Map (NPM) is generated. The NPM can be a binary array wherein each array element indicates the pixel type of a group or all of the pixels in a new frame.

In step 314, a previously classified pixel of the new frame is selected. Once a previously classified pixel is selected in step 314, flow passes to step 318.

In step 318, it is determined how many pixels in proximity to the selected pixel are of a predetermined type (e.g., static, non-static, etc.) and control passes to step 322. In one embodiment, the number of new (non-static) pixels in proximity to the selected pixel is used. In another embodiment, the number of old (static) pixels in proximity to the selected pixel is used. In addition, defining a pixel or pixels to be in proximity to the selected pixel can be done in any number of ways (e.g., pixels in a predetermined radius about the current pixel, one or more adjacent pixels, etc.). In one embodiment, proximity is defined as adjacent pixels in a horizontal and vertical direction.

In step 322, it is determined whether the selected pixel has been classified to be of the predetermined pixel type. If the current pixel has been previously classified to be of the predetermined pixel type, flow passes to step 326. Otherwise, flow passes to step 334.

In step 326, if greater than a first predetermined threshold number of pixels in proximity to the selected pixel are also of the predetermined pixel type, the selected pixel will remain classified as the predetermined pixel type, and flow passes to step 342. Otherwise, flow passes to step 330 where the current pixel is re-classified. From step 330, control passes to step 342.

In step 334, if the number of pixels (determined in step 318) in proximity to the current pixel and of the predetermined type is less than a second predetermined threshold, flow passes to step 342. Otherwise, flow passes to step 338 where the current pixel is re-classified. From step 338, control passes to step 342.

To illustrate, one embodiment of the invention sets the predetermined pixel type to be "new". In this embodiment, if the selected pixel has been classified as new (322), and if greater than a first threshold number of pixels in proximity to the selected pixel have also been classified as new (326), the pixel will remain/be re-classified as new. However, if the number of new pixels in proximity to the selected pixel is not greater than the first predetermined threshold (326), then the selected pixel will be re-classified as old (330).

In step 342, if all of the pixels have been processed, flow passes to step 220. Otherwise, flow passes to step 314 where another pixel is selected. While one embodiment re-classifies each pixel one time, alternative embodiments can re-classify the pixel any number of times using an iteration counter or any other number of techniques.

While this embodiment has been described using a first and a second predetermined threshold in steps 326 and 334, respectively, alternative embodiments could use any number of criteria (e.g., the count of old pixels, relative temporal difference of each or a group of pixels, etc.). Furthermore, alternative embodiments do not necessarily perform both steps 334 and 338 and steps 326 and 330. While an embodiment is described in which all the pixels are initially classified before any pixel is reclassified, alternative embodiments could use a scheme to classify and re-classify each pixel or a group of pixels "on the fly" (e.g., classify and re-classify a pixel or a group of pixels before every pixel in a frame has already been classified). Additionally, alternative embodiments could not perform step 322 and not perform one of: 1) steps 334 and 338; or 2) steps 326 and 330. Furthermore, the first and second thresholds can be defined in a number of ways and have any value or be variable and/or be selectable. Thus, the invention could be practiced in any number of other alternative embodiments wherein pixels are classified and re-classified based on the type(s) of a nearby pixel(s).

Adaptive Compression Threshold Determination

One embodiment of the invention adaptively updates compression thresholds based on activity of a frame region(s). Activity of a region is a function of the number of luminance drops in the region. Since a sequence of luminance drops (or components) generally forms the contours in an image to which human vision is sensitive, activity of frame regions is determined in the present invention to determine appropriate temporal (e.g., motion estimation and compensation) thresholds for regions. By determining an activity value for a region, one embodiment of the invention determines the degree of importance of the region (e.g., sensitivity of human vision to the region) and adaptively sets (temporal) compression thresholds for the region and/or other regions. For example, temporal difference thresholds for using motion compensation for regions with a relatively high activity value (e.g., relatively high number of luminance drops) are set such that a relatively small temporal difference will result in the region being intraframe encoded, so that a satisfactory degree of quality of the high activity level region is preserved, and distortion (that would be recognized by human vision) is diminished.

Figure 4:
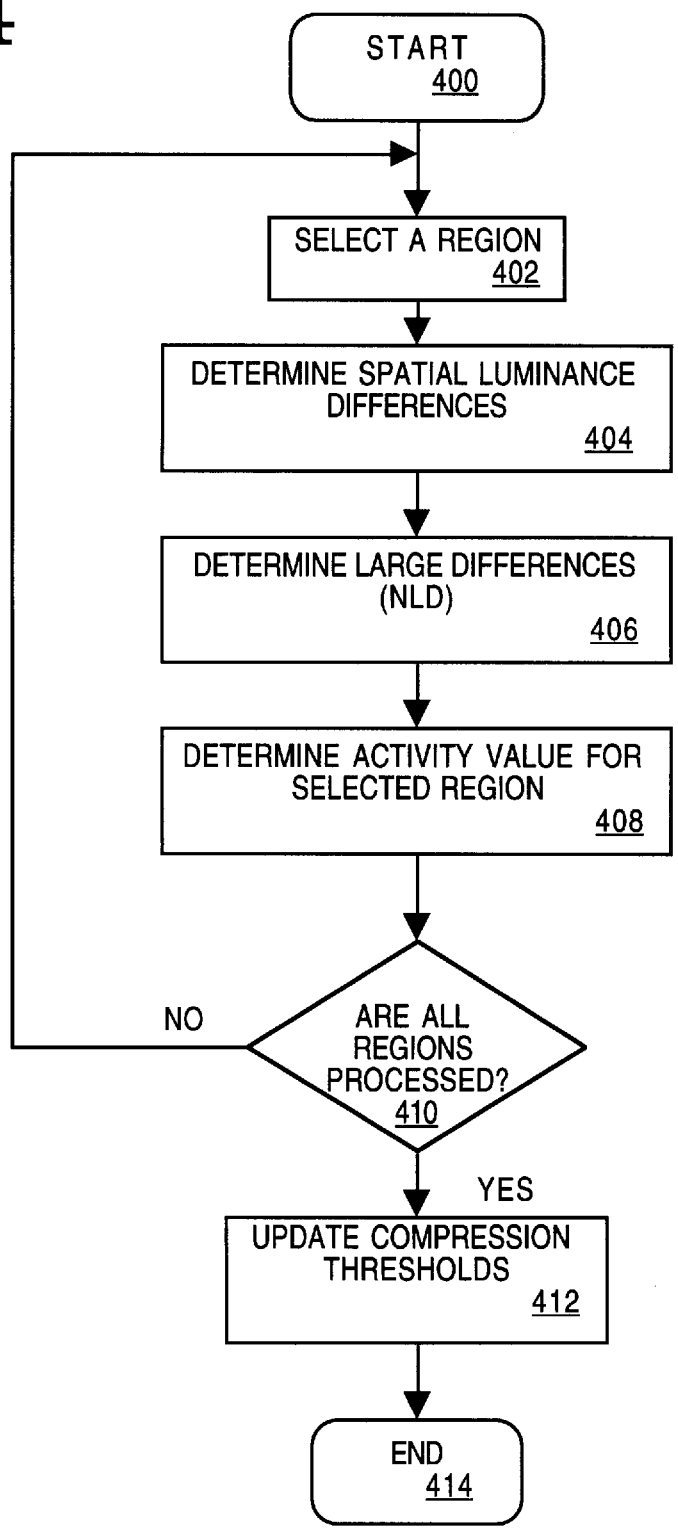
FIG. 4 is a flow diagram illustrating a method for determining activity of a region to adaptively determine (temporal) compression thresholds according to one embodiment of the invention.

FIG. 4 is a flow diagram illustrating a method for determining activity of a region to adaptively determine (temporal) compression thresholds according to one embodiment of the invention. The flow diagram starts at step 400, from which control passes to step 402.

In step 402, luminance components are received for a selected region, and flow passes to step 404. Luminance components are described by a parameter Y, which may be determined from other another pixel component(s), such as Red, Green, Blue ("RGB") using well-known techniques. For example Y can be determined as described in CCIR Recommendation 601 using the equation $$Y = \text{integer value of } (0.299*R + 0.587*G + 0.114*B).$$

Alternative embodiments may use any number of techniques to determine luminance components for pixels.

In step 404, differences between adjacent luminancies in the vertical and horizontal direction in the frame are determined, and flow passes to step 406. To determine luminance differences, the frame is considered as a matrix M having dimensions [n*m], comprising pixel luminancies. An element M(i,j) of the matrix M can be represented by an integer value in the range 0 . . . 255. For each pair (i,j), (0<i<n; 0<j<m), the following differences are calculated in step 404:

$$M(i,j) - M(i+1,j) = \text{the } i^{th} \text{ difference in the } j^{th} \text{ column}$$

$$M(i,j) - M(i, J+1) = \text{the } j^{th} \text{ difference in the } i^{th} \text{ row}.$$

Alternative embodiments may use any number of techniques to determine luminance differences between pixels (e.g., only horizontal differences may be considered, only vertical differences may be considered, etc.).

In step 406, the differences determined in step 404 are compared to an Adaptive Large Difference Threshold (ALDT) to determine a Number of Large Difference (NLD), and flow passes to step 408. The absolute value of the NLD is greater than the ALDT. In the described embodiment the ALDT has an initial value of 20. The value of the ALDT may be changed from frame to frame for the regulation of the average compression ratio for the frame sequence. A relatively large value for the ALDT typically corresponds to a relatively large quantity of low activity regions, and thus, a relatively high compression ratio. If the compression ratio for a previous frame in a sequence of frames is greater than a predetermined value, then the ALDT is decreased by 1. However, if the compression ratio for the previous frame was less than the predetermined value, then the ALDT is increased by 1. The described embodiment, the value of the ALDT is typically in the range of 10 . . . 40. In alternative embodiments of the invention, the ALDT may have a value in any range and/or may be increased/decreased by any number.

In step 408, an activity value is determined for the selected region, and flow passes to step 410. In the described embodiment, activity is determined as an integer in a range 0, . . . ,N, wherein the value 0 corresponds to a minimum (low) activity value and N corresponds to a maximum (high) activity value. The value of the NLD is normalized to provide a relative part of Large Differences among all differences (in percents). For example, the set of all possible values for NLD may be quantized into N intervals in the range of 0% to 100%. For example, in one embodiment where N=4, the interval 0% –20% is assigned an ordering number 0, the interval 20% –40% is assigned the ordering number 1, the interval 40% –60% is assigned the ordering number 2, and the interval 60% to 100% is assigned the ordering number 3, and the activity value (AV) for the selected region can be identified by the ordering number for the interval. For example, if NLD=5%, then AV=0, and if NLD=42%, then AV= 2. In alternative embodiments, the set of possible values for NLD may be divided into N intervals by an appropriate choice of N-1 thresholds $T_1, \ldots, T_{N-1}$. Thus, the activity value can be determined as a number "i", if the interval $(T_i, T_{i+1})$ contains a value of the NLD.

In step 410, if all regions have not been processed, flow passes back to step 400. Otherwise, flow passes to step 412.

In step 412, a compression threshold(s) is determined for each frame region. In one embodiment, the ADLT and the $T_1, \ldots, T_{N-1}$ thresholds are updated based on the activity values of the current frame, and flow passes to step 414 where the flow diagram ends.

In one embodiment of the invention, activity level is determined to determine compression thresholds for frame regions prior to step 220. Alternative embodiments may determine compression thresholds based on activity level at another stage in the compression process. Furthermore, while one technique is described for determining compression thresholds based on activity level, alternative embodiments of the invention may determine compression thresholds (based on luminance/activity) in any number of ways. Furthermore, alternative embodiments do not necessarily perform adaptive compression threshold determination.

FRAME DECOMPOSITION AND ADAPTIVE DETERMINATION OF COMPRESSION

Types of Frame Regions

Figure 5:
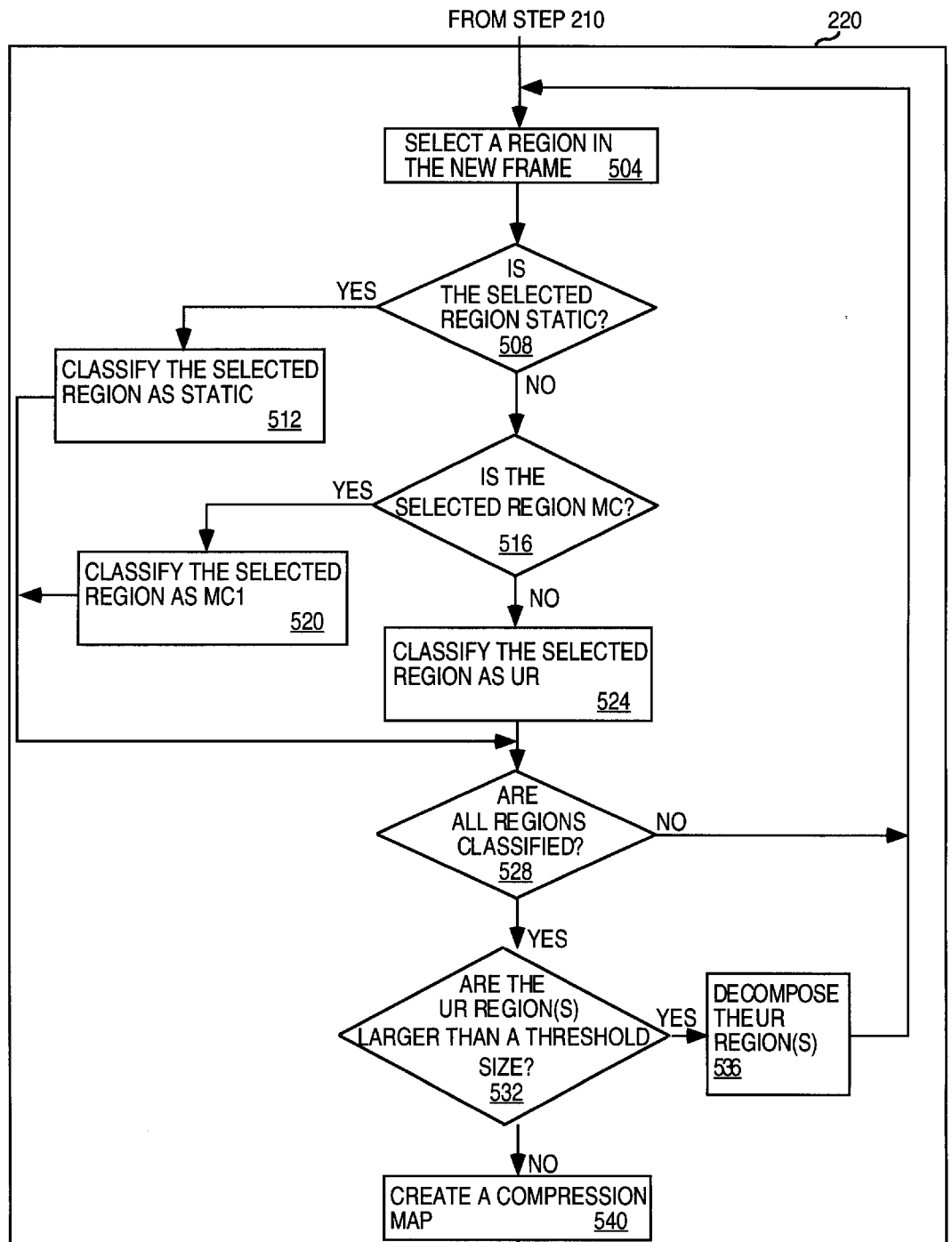
FIG. 5 is a flow diagram illustrating a method for determining compression types for regions of a frame of motion video according to one embodiment of the invention.

FIG. 5 is a flow diagram illustrating a method for determining compression types for regions of a frame of motion video according to one embodiment of the invention. From step 210, control passes to step 504.

In step 504, a region of the new frame is selected, and flow passes to step 508. In one embodiment, a selected region is a rectangular 8×8 block.

In step 508, the selected region is compared to a corresponding region (i.e., at the same spatial location) in a base frame to determine if the selected region is static based on the (temporal) pixel classification in the selected region. If the selected region has greater than a predetermined threshold number of substantially unchanged (old) pixels, and/or conversely, if the region has less than a predetermined threshold number of new pixels, then flow passes to step 512 wherein the selected region is classified as static. Otherwise, flow passes to step 516. Any number of methods that depend on the classification of pixels and/or activity level in the selected region can be used to determine if the selected region is static or not (e.g., number of new pixels in the selected region, number of old pixels in the selected region, high/low activity level, etc.).

In step 516, regions in the base frame are searched to find a region that could be used for motion estimation and compensation for the selected region. In one embodiment, a distance and/or temporal difference threshold that has been adaptively determined based on activity level of frame regions is used to determine if the selected region can be compressed using motion estimation and compensation. If the region can be compressed using motion estimation and compensation, flow passes to step 520 wherein the selected region is classified as a first motion compensation region (MC1). Otherwise, flow passes to step 524.

In step 524, the selected region, which has not been classified as static or MC1 is marked as an unknown region (UR). From steps 512, 520, and 524, flow passes to step 528.

In step 528, if all regions have not been classified, flow returns to step 504 and another region is selected. When all of the frame regions have been classified, flow passes from step 528 to step 532.

In step 532, it is determined if the UR region(s) are greater than a predetermined threshold region size. If the UR region(s) are larger than the predetermined threshold region size, then flow passes to step 536. Otherwise, flow passes to step 540.

In step 536, the UR region(s) are decomposed into smaller regions, and flow returns to step 504. In the described embodiment, the predetermined threshold region size is 8×8 and the UR region is decomposed in step 536 into four 4×4 regions. Alternative embodiments do not necessarily perform steps 532 and 536 (i.e., UR region decomposition is not necessarily performed).

In step 540, once all of the UR regions have been decomposed to a predetermined threshold size (e.g., 4×4) and all of the regions have been classified with a compression type, a compression type map is created, and flow ends. The compression type map contains information identifying a location and compression type for each region in the frame. From step 540, control passes to step 230.

Adaptive (Second Stage) Temporal Compression

Figure 6A:
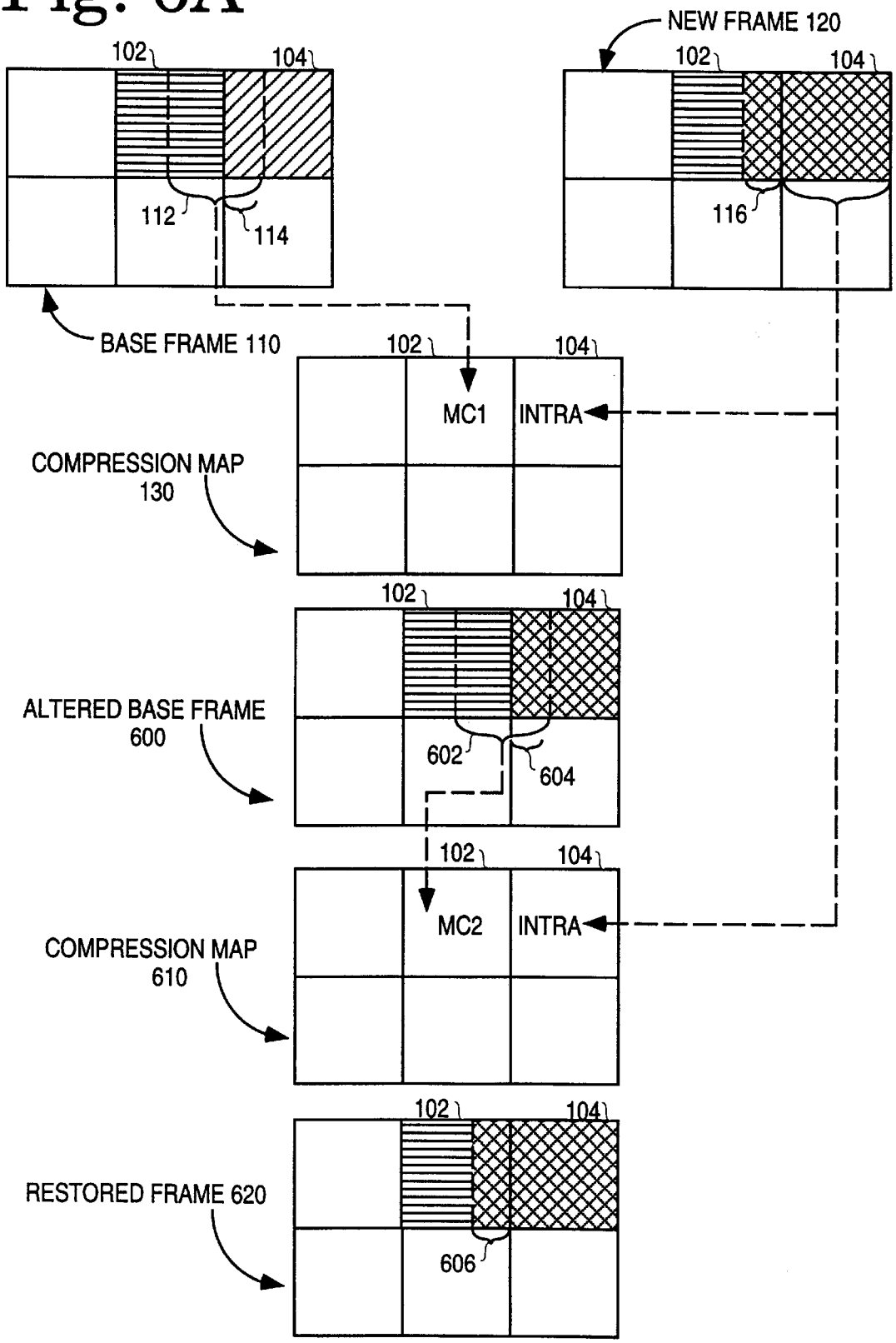
FIG. 6a is a block diagram illustrating a technique for performing adaptive (second stage) temporal compression according to one embodiment of the invention.
Figure 6B:
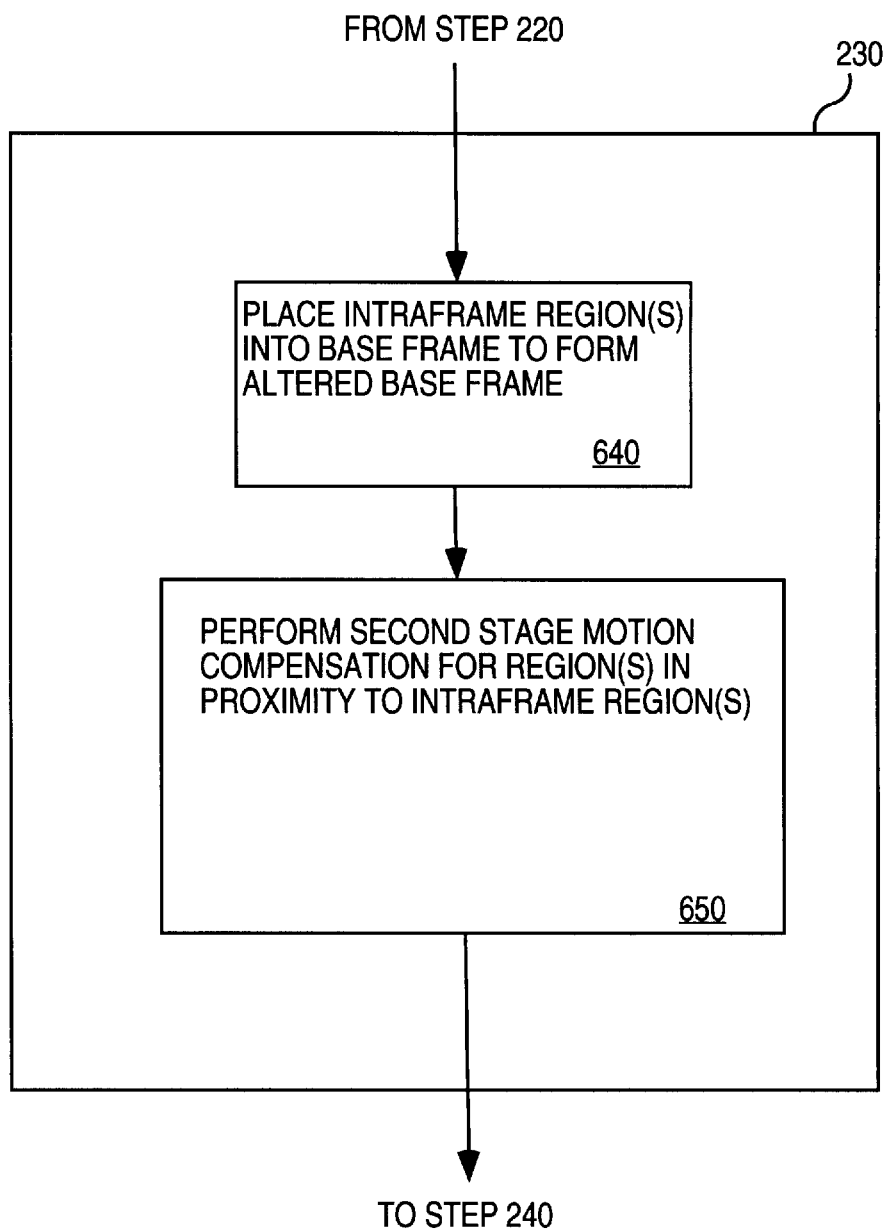
FIG. 6b is a flow diagram illustrating a method for performing second stage temporal encoding according to one embodiment of the invention.

FIGS. 6a–6b illustrate exemplary techniques for performing second stage temporal compression according to one embodiment of the invention.

Figure 1:
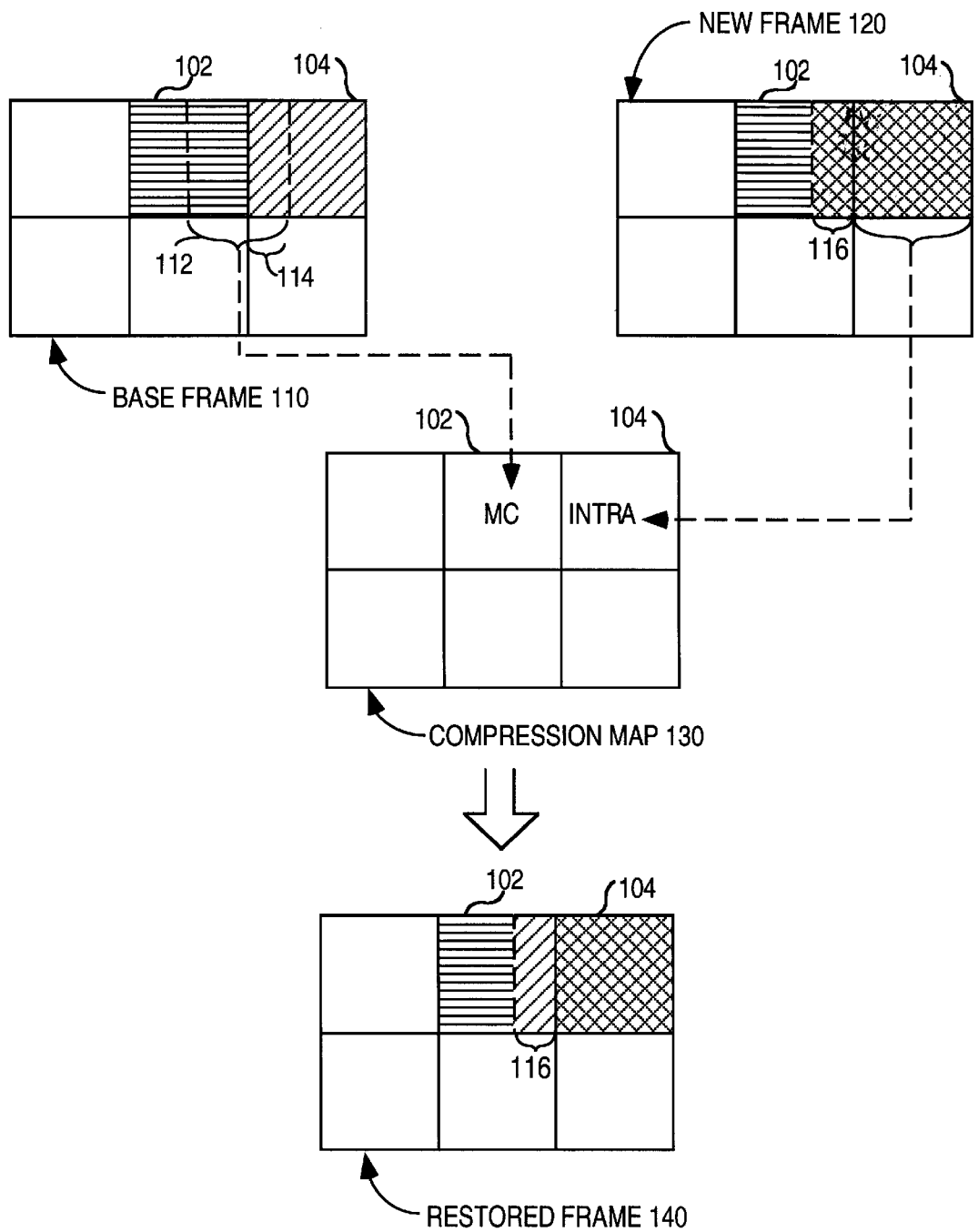
FIG. 1 is a block diagram illustrating another limitation of the prior art motion compensation technique.

FIG. 6a is a block diagram illustrating a technique for performing adaptive (second stage) temporal compression according to one embodiment of the invention. Like FIG. 1, FIG. 6a includes a number of frames each having at the same spatial location the shaded region 102 and the shaded region 104 (e.g., each pattern of shading may represent a particular color, object in the frame, etc.). The base frame 110, new frame 120, and compression map 130 from FIG. 1 are repeated in FIG. 6a.

As previously described with reference to the compression map 130, it has been determined (using any one of a number of well-known techniques) that the region 104 can be compressed using an intraframe compression technique (e.g., DCT) and that the region 102 can be temporally compressed using motion estimation and compensation (MC1). The region 112 (shown by brackets) in the base frame 110 is used for first stage motion compensation (MC1) of the region 102 of the new frame.

As previously described with reference to FIG. 1, the compression map 130 results in the loss of information with reference to the part 116 of the region 102 as illustrated by comparing the new frame 120 to the restored frame 140. To avoid this loss of information, second stage temporal compression is performed.

During second stage temporal compression an altered base frame 600 is generated. The altered base frame 600 represents the base frame 110 having incorporated therein a restored intraframe region 104 corresponding to the region 104 of the new frame 120. Using the altered base frame 600, a compression map 610 is created. A region 602 (shown by brackets) in the altered base frame 600 is selected as an alternative motion compensation (MC2) of the region 102 of the new frame 120.

FIG. 6a includes a restored frame 620 which illustrates the result of restoring (decoding) the regions of the new frame 120 based on the compression map 610. As a result of the alternative motion compensation vector (MC2) selected for the region 102, a part 604 of the interframe encoded/decoded region 104 of the altered base frame 600 is reproduced as a part 606 of the region 102 of the restored frame 620. It should be noted that the shading of the part 606 of the restored frame 620 is different from the shading of the part 116 of the restored frame 140. The shading differs because the part 606 of the restored frame 620 was reproduced from the restored intraframe region 104 of the altered base frame 600. A comparison of the restored frame 140 and the restored frame 620 to the new frame 120 shows that the restored frame 620 is a better predictor. While one example is shown in which MC2 provides a better result than MC1, this may not always be the case.

Thus, unlike the prior art in which all motion compensation vectors identified regions in the base frame, motion compensation vectors (MC2's) determined during second stage temporal compression identify regions in the altered base frame. Since the altered base frame includes the intraframe encoded and decoded regions, the regions identified by MC2's may include part(s) of intraframe encoded and decoded region(s). It should be appreciated that the shading and sizes of the regions (102, 104, 112, and 602) and parts of regions (114, 116, 604, and 606) in FIG. 6a are for illustrative purposes only. For example, the region 112 may or may not be in the same spatial location, be the same size, and/or contain the same (pixel) information as the region 602. Similarly, the parts 114 and 116 may or may not be at the same spatial location, be the same size, and/or contain the same information as the parts 604 and 606, respectively.

While one embodiment of the invention is described wherein a region of a new frame is initially intraframe encoded and restored into a base frame to form an altered base frame, other embodiments can copy a region that is to be intraframe encoded directly from the new frame to the base frame without initial intraframe encoding and/or decoding. Furthermore, while one embodiment is described wherein a base frame is altered to include an intraframe region, other embodiments alter a copy of the base frame. While one embodiment is described wherein motion compensation is performed prior to and subsequent to forming an altered base frame, other embodiments can perform motion compensation either prior to or after forming an altered base frame. Thus, other embodiments of the invention can be practiced without forming an altered base frame.

In contrast to the prior art method of motion compensation shown in FIG. 1, second stage temporal compression can substantially diminish distortion/loss of information due to interference of motion compensation and intraframe compression regions in a frame of motion video. The invention can be practiced in any instance wherein an intraframe region and a motion compensation region are in proximity and/or overlap. Thus, the invention could be practiced in any number of alternative embodiments wherein temporal compression is performed subsequent to placing a region(s) that is to be intraframe encoded into a base frame.

FIG. 6b is a flow diagram illustrating a method for performing second stage temporal encoding according to one embodiment of the invention. From step 220, control passes to step 640. In step 640, an altered base frame is formed by incorporating each region of the new frame (e.g., the new frame 120) that requires intraframe compression into corresponding regions in the base frame (e.g., the base frame 110) to create an altered base frame (e.g., altered base frame 600). While one embodiment is described in which intraframe regions are initially encoded and restored into a base frame to form the altered base frame, alternative embodiments could write the intraframe region directly into the base frame to form the altered base frame without encoding/decoding of an intraframe region(s). Once the altered base frame is formed in step 640, flow passes to step 650.

In step 650, second stage temporal compression (e.g., motion compensation and estimation) is performed by comparing regions in the altered base frame to regions the new frame. In one embodiment of the invention, 4×4 regions that are adjacent to the intraframe regions in the altered base frame are used in the comparison. In alternative embodiments, any size and or shaped regions in a predetermined proximity to an intraframe region(s) can be used for second stage temporal compression. Once second stage temporal compression is performed, flow passes to step 240.

As previously described, one of each of the first or second motion compensation indications is selected in step 240. Any number of methods could be used to select between MC1's and MC2's. For example, one embodiment of the invention determines the absolute (pixel) difference(s) between each motion compensation region in a new frame and its corresponding MC1 and MC2 regions (in the base frame and altered base frame, respectively), and selects the one with the least absolute difference(s). Another embodiment uses the motion compensation indication that corresponds to the least absolute motion of an MC region in the new frame (e.g., a motion compensation vector with the smallest magnitude). Yet another embodiment of the invention always uses MC2's. In such an embodiment, only static and intraframe regions need be identified during the first stage temporal compression (i.e., motion estimation need not be performed during step 220). In addition, step 240 need not be performed (control passes directly from step 230 to step 250). A number of other methods could be used to select a motion compensation indication to encode (and/or decode) a region of a (new) frame.

While one embodiment is described in which second stage temporal compression is performed after all intraframe encoded regions have been inserted into the base frame, alternative embodiments could perform the second stage temporal compression in any number of ways. For example, alternative embodiments of the invention could create an altered base frame that contains information from regions that are to be intraframe compressed and/or information from motion estimation and compensation regions. Furthermore, alternative embodiments of the invention perform second stage temporal compression "on the fly". For example, one embodiment creates an altered base frame based on information from a first region or regions in a new frame and/or a base frame [(based on an intraframe, temporal, and/or any other compression technique(s)], and further alters the altered base frame while determining a compression type for another region or set of regions in the new frame. Thus, one embodiment: (1) determines compression techniques for a first set of regions in the new frame using the base frame; (2) creates an altered base frame based on the determined compression techniques; (3) determines compression techniques for a second set of regions in the new frame using the altered base frame and/or the base frame; and (4) repeats steps (2) and (3) until all regions have been processed. Alternative embodiments of the invention may also use information from frames other than/in addition to a base frame and new frame to create an altered base frame and/or determine compression techniques for regions in the new frame. Thus, second stage temporal compression could be practiced in any number of ways wherein an altered base frame is created containing information from a new (or current) frame and a base frame, and the altered base frame is compared to the new frame to search for compression techniques for regions in the new frame.

In addition, it should be appreciated that while one embodiment alters the base frame to create the altered base frame, alternative embodiments could make a copy of the base frame and create the altered base frame by altering the copy. Furthermore, while in one embodiment second stage temporal encoding is performed only on regions classified as MC1, alternative embodiments perform second stage temporal encoding on regions classified during first stage temporal encoding as static and/or intraframe regions.

Decompression and Frame Restoration

Figure 7:
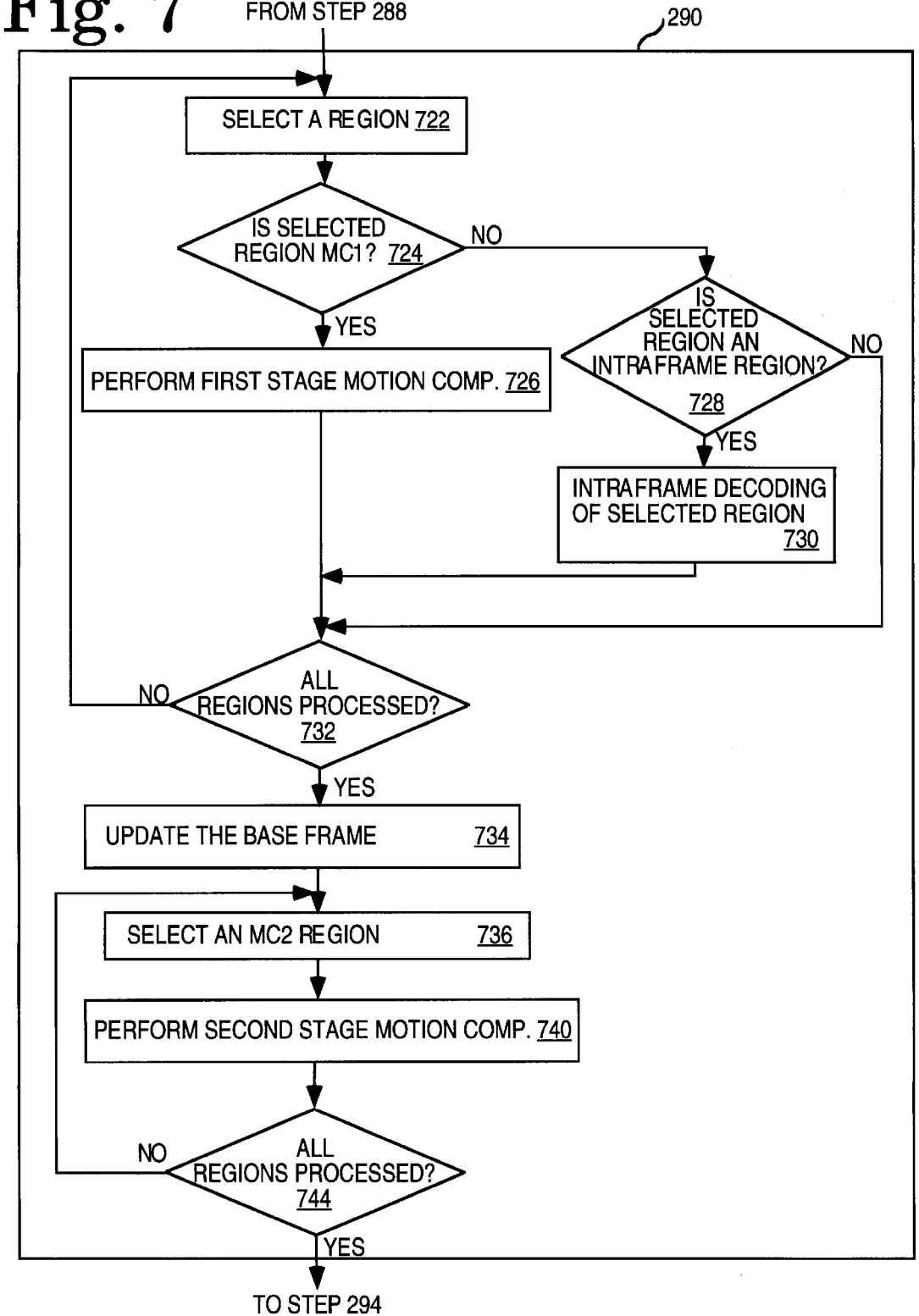
FIG. 7 is flow diagram illustrating a method for restoring a frame and updating the base frame according to one aspect of the invention.

FIG. 7 is flow diagram illustrating a method for restoring a frame and updating the base frame according to one aspect of the invention. From step 288, control passes to step 722.

In step 722, a region of an encoded new frame is selected, and flow passes to step 724. In step 724, if it is determined that the selected region is a first stage motion compensation (MC1) region (i.e., an MC1 vector locates a region in the base frame), flow passes to step 726 wherein the region in the base frame identified by the MC1 vector is found and first stage motion compensation is performed. From step 726, flow passes to step 732. However, if the selected region is not a first stage motion compensation (MC1) region, control passes from step 722 to step 728.

In step 728, if it is determined that the selected region is an intraframe encoded region, flow passes to step 730 wherein the intraframe encoded region is decoded. Otherwise, flow passes to step 732. In the described embodiment, intraframe regions are encoded using discrete cosine transform (DCT) and decoded using a DCT decoder.

In step 732, if all of the regions in the new frame have been processed, flow passes to step 734 wherein the base frame is updated. Otherwise, flow returns to step 722 wherein another region in the new frame is selected. In one embodiment, the base frame is updated to include the intraframe decoded regions. However, alternative embodiment alter a copy of the base frame and/or update the base frame to include first stage motion compensation (MC1) regions (depending on the encoding techniques used).

From step 734, flow passes to step 736 wherein a second stage motion compensation (MC2) encoded region from the new frame is selected. From step 736, flow passes to step 740. In step 740, second stage motion compensation is performed for the selected MC2 region (a copy of the motion compensation region identified by MC2 is copied), and flow passes to step 744. In step 744, if all of the regions have not been processed, flow returns to step 736, wherein another MC2 region is selected. Otherwise, flow passes to step 294.

Thus, a method according to one embodiment of the invention has been shown wherein a (current) base frame is updated using encoded information from a new frame to form the altered base frame. This altered base frame is then used to perform second stage motion compensation to restore regions of the current frame. Once the current frame has been restored, the restored frame becomes the base frame for the next new frame.

It should be appreciated that since decompression generally performs the inverse of operations performed in compression, for every alternative embodiment of compression, there is a corresponding decompression technique. For example, alternative embodiments of decompression could perform decompression by altering a base frame on the fly (e.g., inserting regions into the base frame as they are processed). Similarly, alternative embodiments of the invention could only perform second stage motion compensation. Furthermore, alternative embodiments could use frames other than a current (new) frame and previous (base) frame in a sequence of motion video frames to restore a current frame.

Hardware Overview

While the invention may be implemented using any number of combinations of hard-wired circuitry and software instructions, two exemplary implementations are described below with reference to FIGS. 8a and 8b.

Figure 8A:
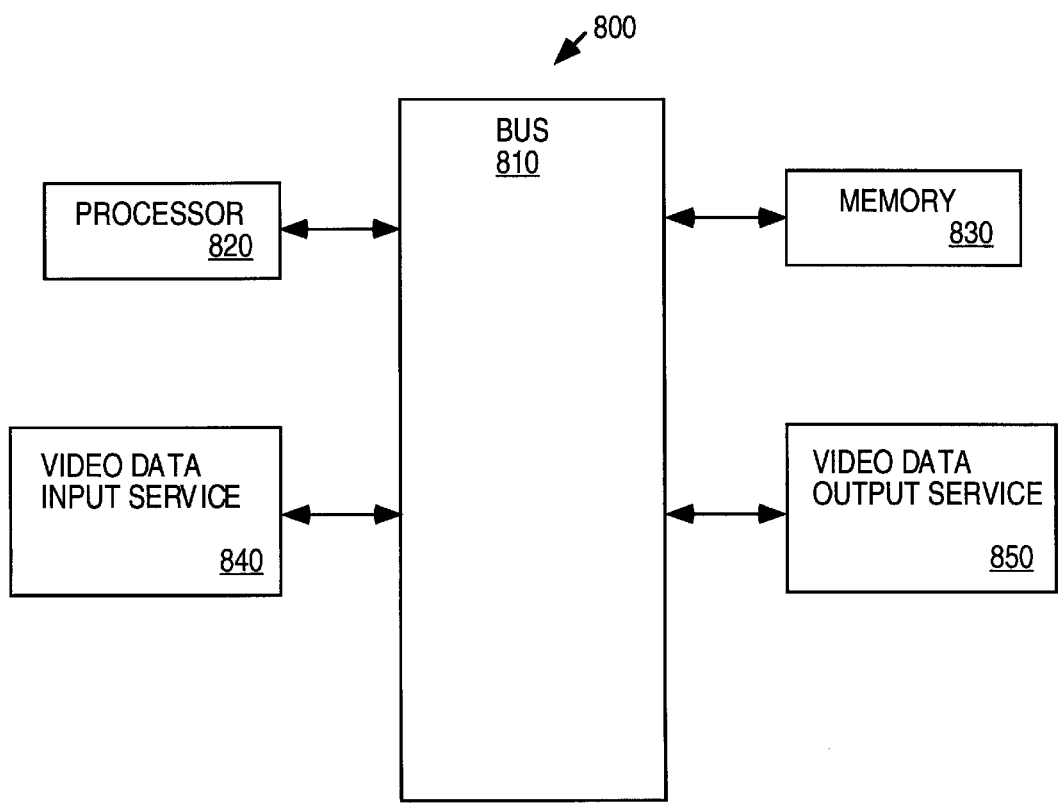
FIG. 8a is a block diagram of an exemplary computer system upon which the present invention could be implemented.

FIG. 8a is a block diagram of an exemplary computer system upon which the present invention could be implemented. A computer system 800 comprises a bus or other communication means 810 for communicating information. A processor 820 capable of encoding and/or decoding motion video according to the teachings of the invention is coupled to the bus 810. The processor 820 can be a dedicated processor for implementing the invention, or a general purpose processor.

A memory 830 which can store routines to implement the present invention, compressed video data, uncompressed video data, decompressed video data, and/or other types of data is also coupled to the bus 810. A video data input device 840 is also coupled to the bus 810. The video data input device can be any number of devices (e.g., video camera, VCR, CD ROM, magnetic storage media, etc.). Also coupled to the bus 810 is a video data output device 850. The video output device 850 can be any number of devices (e.g., communication media, a display, etc.).

In one embodiment, the invention is related to the use of the computer system 800 to implement adaptive hybrid video compression and/or decompression system according to the teachings of the invention. In this embodiment, motion video data is compressed and/or decompressed by the processor 820 according to the teachings of the present invention in response to the processor 820 executing a sequence of instructions that are stored in the memory 830. The memory 830 could be ROM, RAM, and/or any number of machine readable media (e.g., magnetic storage, CD ROM, etc.).

The computer system 800 could also include any one of a number of devices not shown in FIG. 8a, such as a user input device (e.g., a keyboard, mouse, etc.), other memories, additional processors, a network communication device, etc.

Figure 8B:
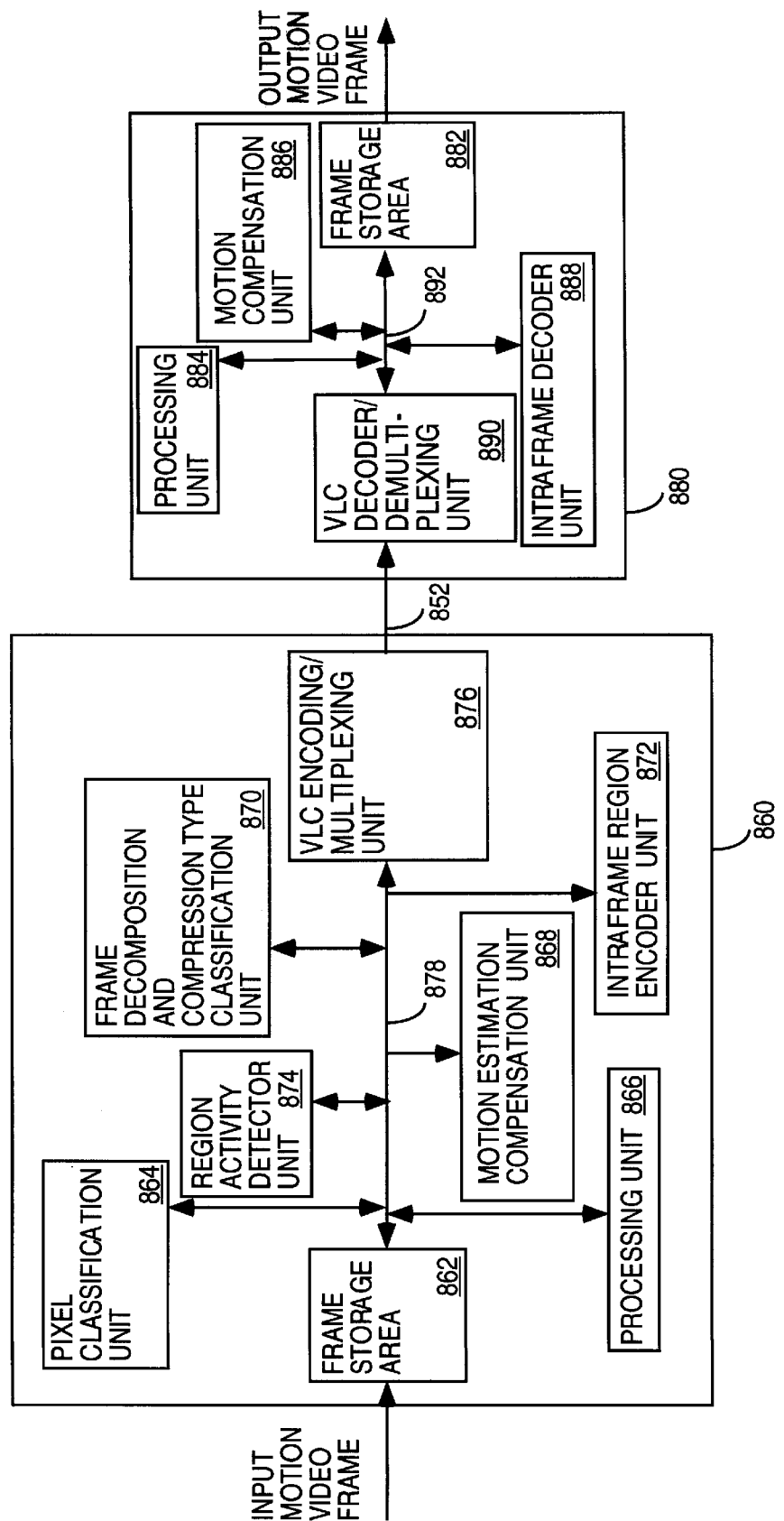
FIG. 8b is a block diagram of an encoding/decoding system according to another embodiment of the invention.

FIG. 8b is a block diagram of an encoding/decoding system according to another embodiment of the invention. A video encoder 860 comprises a data communication line 878. The data communication line 878 could be any number of communication media, such as wiring, optical fiber, etc. In one embodiment of the invention, the data communication line 878 is a local data bus. Coupled to the data communication line 878 are a processing unit 866 and a frame storage area 862 used for storing an input (new) motion video frame. The input motion video frame could be received from any number of sources (e.g., a video camera, CD ROM, another storage area, etc.). The frame storage area 862 could also be used to store a base frame and/or an altered base frame. In alternative embodiments, a plurality of storage areas are used for storing each one or a combination of a base frame, a new frame, an altered base frame, etc.

Also coupled to the data communication line 878 are a pixel classification unit 864, a region activity detector unit 874, a frame decomposition and compression type classification unit 870, a motion estimation/compensation unit 868, an intraframe encoder unit 872, and a VLC encoding/multiplexing unit 876. The pixel classification unit 864 performs pixel classification and re-classification. The region activity detector unit 874 determines activity for frame regions to update appropriate compression thresholds for regions in the frame. The results of the re-classification of pixels and region activity levels is used by the frame decomposition and compression type classification unit 870 to determine a compression type technique (e.g., intraframe, motion compensation, etc.) for regions of the input motion video frame.

The motion estimation/compensation unit 868 performs first and/or second stage motion estimation, and the intraframe encoder unit 872 performs intraframe compression. While the described embodiment employs discrete cosine transform (DCT) in the intraframe encoder unit 872, any number of other intraframe compression techniques can be used in alternative embodiments of the invention (e.g., BTC, FFT, etc.). The VLC encoding/multiplexing unit 876 further compresses and multiplexes encoded information of the input motion video frame (encoded intraframe regions, motion compensation vectors, region map information, etc.) into a bit stream. The bit stream of encoded motion video data corresponding to the input (new) motion video frame is output via a communication line 852 to a decoder 880. The communication line 852 could be part of a network segment, a telephone line, or any other number of data communication media.

The decoder 880 comprises a data communication line 892 coupling a frame storage area 882, a processing unit 884, a motion compensation unit 886, an intraframe decoder unit 888, and a VLC decoder/demultiplexer unit 890. The VLC decoder/demultiplexer unit 890 decodes the input bit stream received on communication line 852. The motion compensation unit 886 and the intraframe decoder unit 888 perform motion compensation and intraframe decompression, respectively, and update a base frame stored in the frame storage area 882. The updated base frame can be stored in the frame storage area 882 and/or output to any number of devices (e.g., a video display, a storage area, an encoder, etc.).

Of course, the present invention can be implemented using any number of dedicated processors and/or any number of multi-purpose processors. Yet other embodiments of the invention could be implemented upon a dedicated device, such as a video card, in place of or in combination with other devices and/or software.

ALTERNATIVE EMBODIMENTS

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for compression of motion video data comprising the computer-implemented steps of:

comparing a first frame to a base frame;

determining a set of regions in said first frame to be intraframe encoded;

creating an altered base frame in which at least certain regions at the same spatial location as said set of regions in said first frame are derived from said set of regions in said first frame, and in which at least certain remaining regions are derived from said base frame;

deriving a first motion compensation vector for a first region in said first frame from said altered base frame, said first motion compensation vector indicating a first region in said altered base frame that is similar to said first region in said first frame.

2. The method of claim 1, wherein said step of creating said altered base frame includes the steps of:

encoding said set of regions from said first frame to create an encoded set of regions, decoding said encoded set of regions to create a decoded set of regions; and inserting said decoded set of regions into said base frame.

3. The method of claim 2 further comprising the step of intraframe encoding said set of regions from said first frame using discrete cosine transform (DCT).

4. The method of claim 1, wherein said step of creating said altered base frame includes the step of:

copying said set of regions from said first frame into said base frame.

5. The method of claim 1, further comprising the step of:

locating a first region in said base frame that is similar to said first region in said first frame; and storing, for said first region in said first frame, a second motion compensation vector that identifies said first region in said base frame.

6. The method of claim 5, further comprising the steps of:

selecting either said first motion compensation vector or said second motion compensation vector.

7. The method of claim 1, wherein said step of creating said altered base frame includes the step of altering said base frame to create said altered base frame.

8. The method of claim 1, wherein said first region in said altered base frame overlaps at least a part of said set of regions from said first frame.

9. The method of claim 1, wherein said altered base frame is substantially identical to said base frame, except that regions that are at the same spatial location as said set of regions from said first frame are substantially identical to said set of regions from said first frame.

10. The method of claim 1, wherein said altered base frame is altered every time a compression method is determined for a region in said first frame.

11. A method for decompression of compressed data representing a first frame of motion video, comprising the computer implemented steps of:

decoding a first set of regions in said first frame;

creating an altered base frame that includes information from a previously decoded base frame and said first set of regions in said first frame; and decoding a first region in said first frame based on a motion compensation vector derived from said altered base frame, said first motion compensation vector indicating a first region in said altered base frame that is similar to said first region in said first frame.

12. A method for decompression of motion video data, comprising the computer implemented steps of:

decoding encoded data representing a first set of regions in a first frame;

creating an altered base frame that includes information from a previously decoded base frame and information derived from said first set of regions in said first frame; and decoding a second set of regions in said first frame using motion compensation vectors derived from said altered base frame, said motion compensation vectors indicating motion compensation regions in said altered base frame that are similar to said second set of regions in said first frame.

13. The method of claim 12, wherein said altered base frame contains regions that are similar to regions in said previously decoded base frame and regions that are similar to regions in said first frame.

14. A method for compression of motion video data comprising the machine-implemented steps of:

performing a first comparison, said first comparison comprising the step of comparing a first frame to a base frame;

based on said first comparison, creating an altered base frame that contains a set of regions from said base frame and a set of regions derived from said first frame;

performing a second comparison, said second comparison comprising the step of comparing said altered base frame to said first frame; and based on said second comparison, deriving a first motion compensation vector to identify a first region in said altered base frame that is similar to a first region in said first frame.

15. The method of claim 14, wherein said step of creating said altered base frame includes the steps of:

encoding a set of regions from said first frame to create an encoded set of regions;

decoding said encoded set of regions to create said set of regions derived from said first frame; and incorporating said set of regions derived from said first frame into said base frame.

16. The method of claim 14, wherein said step of creating said altered base frame includes the step of:

copying a set of regions from said first frame, representing said set of regions derived from said first frame, into said base frame.

17. The method of claim 14, further comprising the step of:

locating a first region in said base frame that is similar to said first region in said first frame; and storing, for said first region in said first frame, a second motion compensation vector that identifies said first region in said base frame.

18. The method of claim 14, wherein said step of creating said altered base frame includes the step of altering said base frame to create said altered base frame.

19. The method of claim 14, wherein said first region in said altered base frame overlaps at least a part of said set of regions derived from said first frame.

20. The method of claim 14, wherein said altered base frame is substantially identical to said base frame, except that regions that are at the same spatial location as said set of regions derived from said first frame are substantially identical to said set of regions derived from said first frame.

21. The method of claim 14, wherein said altered base frame is altered every time a compression method is determined for a region in said first frame.

22. A method for decompression of motion video data comprising the computer implemented steps of:

receiving encoded video data for a first frame for which a first set of regions was intraframe encoded and a second set of regions was motion compensated;

decoding said first set of regions;

inserting said first set of regions into a previously decoded base frame to generate an altered base frame;

accessing motion compensation regions in said altered base frame relative to motion compensation vectors for said second set of regions; and creating a representation of said first frame from at least the decoded first set of regions and the motion compensation regions.

23. The method of claim 22 wherein:

said step of receiving encoded data for said first frame further includes the step of receiving encoded data for said first frame for which a third set of regions in said first frame was motion compensated; and said method further includes the step of accessing motion compensation regions in said previously decoded base frame relative to the motion compensation vectors for said third set of regions.

24. The method of claim 22 wherein said previously decoded base frame is a decoded representation of a second frame that occurs earlier in said motion video data than said first frame.

25. The method of claim 22 wherein at least one of said motion compensation regions overlaps one of said first set of regions in said altered base frame.

* * * * *